United States Patent [19]

Binley

[11] Patent Number: 4,746,523
[45] Date of Patent: May 24, 1988

[54] METHOD AND APPARATUS FOR PREPARING A SHAPED ICE CONFECTION PRODUCT

[75] Inventor: Gary N. Binley, Kettering, England

[73] Assignee: Thomas J. Lipton, Inc., Englewood Cliffs, N.J.

[21] Appl. No.: 860,070

[22] Filed: May 6, 1986

[30] Foreign Application Priority Data

May 9, 1985 [GB] United Kingdom ............... 8511701

[51] Int. Cl.$^4$ .................... A23G 9/26; A23G 9/00
[52] U.S. Cl. ........................... 426/249; 426/134; 426/565; 426/512; 426/515; 99/455; 99/453; 425/574; 425/581; 425/126.2; 264/28; 264/319
[58] Field of Search ............... 426/249, 512, 515, 524, 426/134, 565, 566, 567; 99/455, 453; 425/126 S, 126 R, 129 R, 574, 575, 576, 581; 264/28, 319

[56] References Cited

U.S. PATENT DOCUMENTS

| 2,173,850 | 9/1939 | Lockwood | 107/54 |
|---|---|---|---|
| 2,689,537 | 9/1954 | Peyton | 426/249 |
| 3,327,651 | 6/1967 | Nielson | 425/575 |
| 4,244,470 | 1/1981 | Burnham | 426/515 |
| 4,500,553 | 2/1985 | Liggert et al. | 426/249 |
| 4,557,117 | 12/1985 | Furia et al. | 425/126 S |

*Primary Examiner*—Jeanette Hunter
*Attorney, Agent, or Firm*—Brumbaugh, Graves, Donohue & Raymond

[57] ABSTRACT

A method for preparing a shaped ice confection product wherein a mixture of ice particles and a liquid, which mixture is pumpable under pressure but maintains its shape if unsupported, is introduced under pressure into a mould which is closed apart from venting openings. An apparatus for manufacturing shaped ice confection products comprising means for manufacturing an ice confection mixture comprising ice cristals and a liquid phase, a chamber (1) with pressurizing means (2) and a devisible mould (7) having heating means (15) and being closed, apart from venting openings.

11 Claims, 1 Drawing Sheet

METHOD AND APPARATUS FOR PREPARING A SHAPED ICE CONFECTION PRODUCT

This invention relates to the production of ice confection products and in particular it relates to a method and an apparatus which are suited for the preparation of ice confection products in pieces of various chosen decorative shapes having complex relief features so that they could not be drawn out of a conventional ice confection mould.

A number of processes for making ice confection products and in particular ice lollies in decorative shapes have been proposed, in particular involving the use of flexible moulds (GB 1 508 589), the use of shaped, profile inserts for rigid moulds of plain configuration (GB 2 097 907), the reshaping of plain blanks between pressure dies (GB 2 074 082) and the use of split mould parts which can be withdrawn in two directions to allow the production of complex relief shapes.

One of the problems in most methods for the production of ice confectionery products arises from the need to abstract heat at an acceptable rate during the freezing step of the products in a mould, and in particular a mould of complex shape. In the pressure reforming method there is a need to provide relatively heavy-duty presses to provide the required rate of working of the already frozen ice pieces. Moreover the known methods are imposing severe limitations as regards the freedom of design of the final products.

According to the invention, these and other disadvantages can be largely or entirely avoided in a method of preparing a shaped ice confection product comprising introducing a deformable ice mixture into a cavity of a mould, demoulding a shaped ice confection in a solid state and thereafter cooling the shaped ice confection for hardening it, wherein an ice mixture which is partly frozen, such that it comprises separate ice particles and a continuous liquid phase in relative amounts such that it maintains its shape if unsupported, is introduced under pressure into a mould which is closedapart from venting openings, and the pressure is released before the resulting shaped product is removed from the mould.

Preferably a divisible mould having a re-entrant and in particular a bulbous cavity shape is used. For easier removing the shaped product from the mould the latter is preferably heated at a temperature in excess of that of the ice mixture, or is having sintered, microporous cavity walls.

For making water ice products preferably a water ice mixture comprising from 45 to 75% and particularly from 50 to 60% by weight of ice crystals is introduced into the mould cavity. For making ice cream and similar products, i.e. containing from about 3 to about 18% by weight of fat preferably such a mixture comprising from 30 to 45% by weight of ice crystals is introduced into the mould cavity.

For making stick products at least one stick may be partly inserted into the mould cavity, which may be done either before or after introducing the ice mixture.

In certain instances, such as if one stick is to be arranged such that both extremities are to protrude from the shaped ice confection or if the additional procedure of temporarily closing the stick inserting openings during filling the mould cavity is to be avoided, it is preferred that the stick is partly inserted into the mould cavity before the ice mixture is introduced. This method can be conveniently used for inserting a plurality of sticks at different positions into the mould cavity. Another possibility of the method of the invention is manufacturing ice confection beads on a flexible string by partly inserting a string into the mould.

The invention also relates to an apparatus for manufacturing shaped ice confection products comprising a chamber with pressurizing means and a divisible mould having heating means, the moulding cavity of which mould is connected with said chamber. Preferably this mould is closed apart from venting openings, which are small enough to prevent the passage of a substantial amount of liquid therethrough. In a preferred embodiment the mould has a re-entrant and in particular a bulbous cavity shape. For making thick products the mould comprises at least one stick inserting opening. For making the multi-stick products as described hereinabove the mould may be provided with a plurality of stick inserting openings at different positions of the mould cavity.

The part-frozen mixture may be made in a conventional ice making machine, such as comprising a scraped heat exchanger, which is delivered to the above mentioned chamber. To that end the chamber may be connected to the ice making machine. This option provides a relatively high throughput. Alternatively the chamber and the pressurizing means form part an ice making machine comprising a scraped suface heat exchanger with a transport screw.

The invention will by way of example be elucidated in the accompanying drawing and the appertaining description and an example of the method of the invention.

Figure 1:
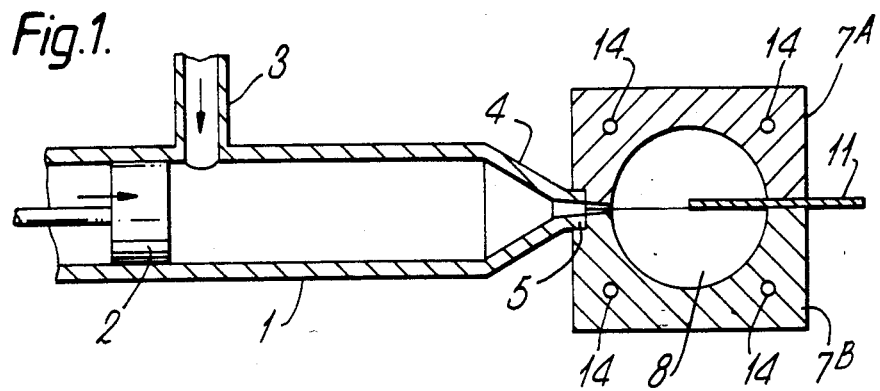
FIG. 1 shows a schematic representation of an apparatus according to the invention in sectional view.

In FIG. 1a cylindrical chamber 1 accomodating a piston 2 as a pressurizing means is shown. A side conduit 3 is meant for connecting the chamber to an ice making machine, such that it delivers a partly frozen ice mixture into the chamber 1. At the end 4 remote from the piston 2 the chamber is tapering and provided with coupling means 5, matching with a filling opening 6 in a divisible mould 7.

Figure 2:
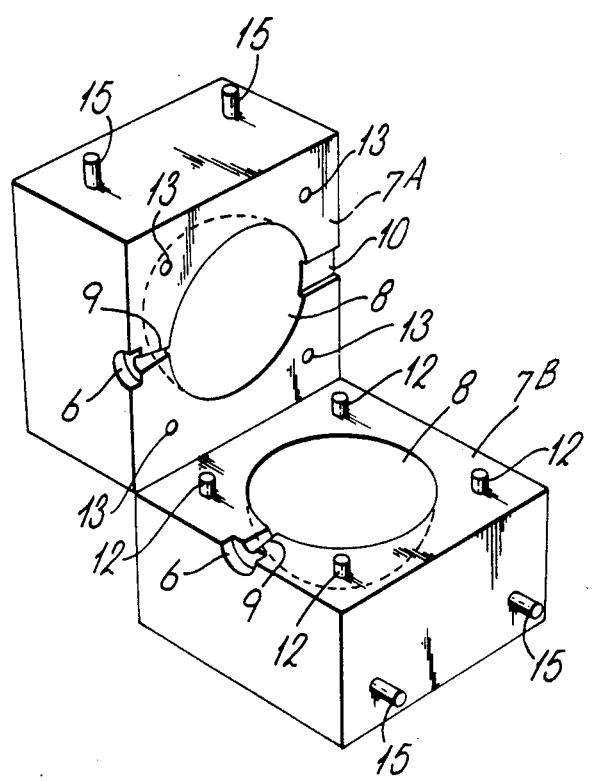
FIG. 2 shows in a perspective view an embodiment of an opened mould for use in the method of the invention.

The mould, as better shown in FIG. 2, comprises two mould halves 7A and 7B in each of which part of the mould cavity 8 is accomodated. The filling opening 6 is connected by a funnel shaped conduit 9 to the mould cavity 8, such that the narrow end of the conduit 9 opens into the mould cavity 8. The join between the mould halves 7A, 7B acts as a venting means when filling the mould cavity.

One of the mould halves 7A is provided with a stick inserting opening shaped as a straight slot 10 for accomodating a stick 11. A plurality of such slots may be provided for accomodating more than one stick. If two slots are diametrically opposed one stick may extend with its both extremities from the mould cavity. If a string is to be used instead of the stick the inserting opening is to be adapted to the cross-sectional shape of the string.

For suitably registering the mould halves one is provided with usual pins 12 matching with openings 13 in the other. For controlling the temperature of the mould 7 a circuit 14 is arranged in both mould halves 7A, 7B each having connecting means 15 for feeding a heating medium therethrough.

This apparatus can be used as follows: a usual mixture for water ice, containing water, sucrose, locust bean gum and flavours, is frozen to a temperature of −5° C., in a scraped surface heat exchanger or votator and thereafter fed through the conduit 3 into the chamber 1. The slush obtained from the heat exhanger contains 50% ice particles and is pumpable through conduits but does not deform if left unsupported. Thereafter the piston 2 is energized and moved towards the tapering end 4 of the chamber, thereby pressurizing the ice mixture and expelling it through the coupling means 5 and the tapering conduit 9 into the mould cavity 8 of the closed mould 7. A usual stick 11 has been inserted into the slot 10, partly extending into the mould cavity. During the injection of the part-frozen ice mixture air from the mould cavity can be vented through the join between the mould halves. By circulating a warm liquid through the circuit 14 the mould cavity wall is kept at a temperature just over the melting point of the ice mixture.

After filling the mould cavity 8 with ice mix under a pressure sufficient for transporting the part-frozen material, such as of at least about 2 bar, but preferably for increasing the production rate of about 25 bar, the pressure in the chamber 1 is released, the mould halves are separated and the product is withdrawn. After closing the mould and inserting a stick the apparatus is ready for a next moulding cycle.

After removal of the shaped ice confection product from the mould it has to be hardened in order that it can be stored and shipped and to that end it can be conveyed through a cooling tunnel. For giving the product an immediate rigidity it may be sprayed with or dipped in liquid nitrogen.

I claim:

1. In a method of preparing a shaped ice confection product comprising introducing a deformable partly frozen ice mixture composition into a cavity of a mold to form a shaped ice confection product, demolding the shaped ice confection product in a solid state and thereafter cooling the shaped ice confection product to harden it, the improvement comprising the step of introducing the partly frozen ice mixture composition into the cavity while under pressure and while it comprises separate ice crystals and a continuous liquid phase in relative amounts sufficient to maintain the shape of the ice mixture composition if unsupported, said mold being closed except for venting openings.

2. Method according to claim 1 further comprising releasing the pressure from the mold and removing the shaped ice confection product therefrom.

3. Method according to claim 1 in which the partly frozen ice mixture composition is a water-ice mixture containing from 45 to 75% by weight of ice crystals.

4. Method according to claim 3 in which the partly frozen ice mixture composition contains from 50 to 60% by weight of ice crystals.

5. Method according to claim 1 in which the partly frozen ice mixture composition contains from 3 to 18% by weight of fat and from 30 to 45% by weight of ice crystals.

6. Method according to claim 1 in which the mold has a bulbous cavity.

7. Method according to claim 1 further comprising heating the mold to a temperature higher than that of the ice mixture composition during the demolding step to facilitate removal of the shaped ice confection product.

8. Method according to claim 1 wherein the mold has sintered microporous cavity walls to facilitate removal of the shaped ice confection product.

9. Method according to claim 1 further comprising partially inserting at least one ice confection support chosen from the group consisting of sticks and string into the cavity of the mold prior to introducing the ice mixture composition, such that the shaped ice confection product will have at least one support inserted therein.

10. Method according to claim 9 wherein the support is inserted into the mold cavity in such a way to allow for both extremities of the support to extend from either side of the cavity.

11. Method according to claim 9 wherein a plurality of sticks is inserted into the cavity of the mold at different positions.

* * * * *